United States Patent [19]

Joly

[11] Patent Number: 4,919,995
[45] Date of Patent: Apr. 24, 1990

[54] HEAT-INSULATING DEVICE COMPRISING RADIATION-REFLECTING MATERIALS AND A CONDUCTION-INSULATING MATERIAL

[75] Inventor: Claude Joly, Puteaux, France

[73] Assignee: Bronzavia Aeronautique, Nanterre, France

[21] Appl. No.: 154,044

[22] Filed: Feb. 9, 1988

[30] Foreign Application Priority Data

Feb. 13, 1987 [FR] France ................ 87 01866

[51] Int. Cl.⁵ ............... B32B 3/22; B32B 5/16; B64C 1/40; F16L 59/08
[52] U.S. Cl. ................. 428/189; 244/117 R; 244/121; 244/133; 428/221; 428/283; 428/285; 428/286; 428/363; 428/404; 428/407; 428/920
[58] Field of Search ............... 244/117 R, 121, 133; 428/189, 221, 283, 285, 286, 363, 404, 407, 920

[56] References Cited

U.S. PATENT DOCUMENTS 3,821,059 6/1974 Hensel ................ 428/319.7
4,166,146 8/1979 Koos ................ 428/319.7

FOREIGN PATENT DOCUMENTS 2750457 6/1978 Fed. Rep. of Germany.
1545706 8/1967 France.
2382642 9/1972 France.

Primary Examiner—James C. Cannon
Attorney, Agent, or Firm—Oblon, Spivak, McClelland, Maier & Neustadt

[57] ABSTRACT

In a heat-insulating device comprising radiation-reflecting elements and a conduction-insulating material, the reflecting elements comprise a large number of reflecting flakes that are inserted into and distributed in the insulating material facing the surface through which the radiation has to be stopped. The said flakes are juxtaposed and partially overlap one another so as to conceal the said surface.

14 Claims, 1 Drawing Sheet

FIG_1
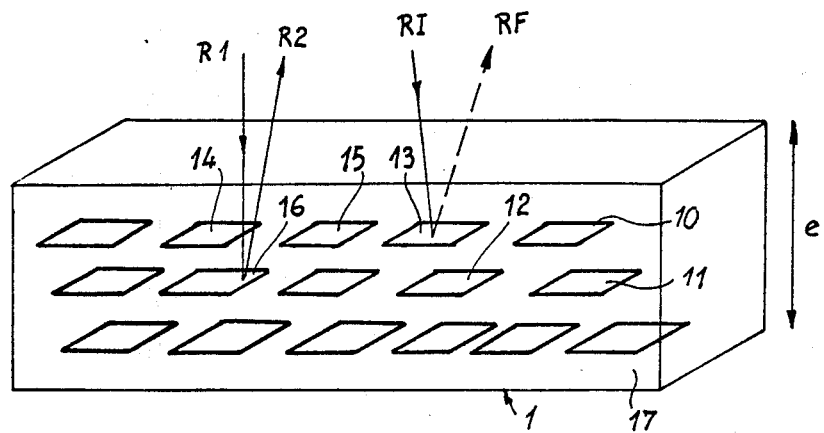
FIG_2
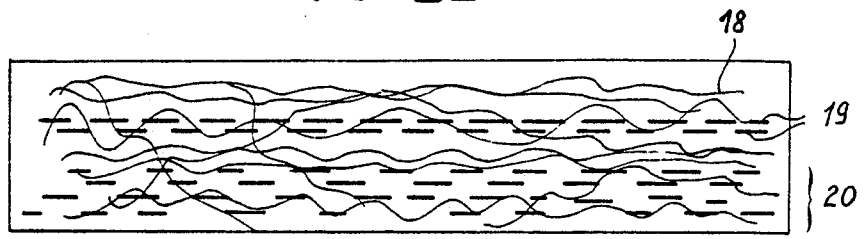
FIG_3
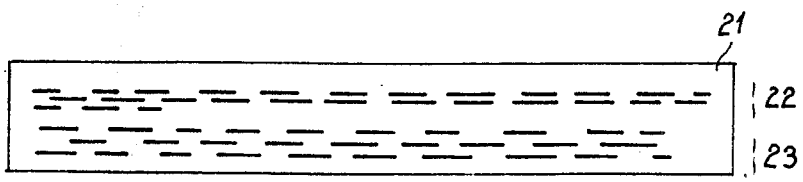

HEAT-INSULATING DEVICE COMPRISING RADIATION-REFLECTING MATERIALS AND A CONDUCTION-INSULATING MATERIAL

BACKGROUND OF THE INVENTION

1. Field of the Invention

An object of the invention is a light heat-insulating device comprising elements that reflect radiation, especially infra-red radiation, and a conduction-insulating material, a device that is efficient at high temperatures, i.e. temperatures in the range of at least 800 degrees C.

Owing to its lightness and efficiency, a device of this type can be used especially in aeronautics for heat shielding, but can also be used in many other fields of application where lightness and efficiency are required simultaneously, or else in cases where just efficiency is required

2. Description of the Prior Art

There are known devices of this type in which at least one reflecting screen is interposed between two layers of an insulating material such as quartz wool or mineral wool. The insulating material blocks the transmission of heat by conduction but, owing to its low compactness, it is not opaque to radiation, and this is why reflecting screens are interposed in order to add to the effect of the insulating material. The reflecting screens are, for example, based on a metal having properties that do not deteriorate at working temperatures.

A particular device is known from the French patent delivered under the number 1,545,706, wherein a reflecting screen consists of a sheet of mica coated with a thin layer of gold.

However, these known devices have various disadvantages because, firstly, the screens are relatively heavy, and secondly, depending on the material of which they are made, they are too rigid or too brittle. Consequently, they cannot be used in any configuration whatsoever or under any mechanical stresses whatsoever. Finally, in the particular example of the French Pat. No. 1,545,706, there is an additional disadvantage related to the fact that the sheets of mica, used as a support for the gold, have to be made by splitting and then bonding elementary sheets of mica together before depositing the thin layer. Furthermore, if the reflecting surface has to be too great, several sheets made in this way have to be bonded together before they are coated with gold.

The bonding of mica is a delicate operation. This is because it is necessary to find a bonding material that withstands the working temperature and because, under the influence of vibrations or external stresses, the sheets remain relatively brittle especially if their area is large.

An object of the invention, therefore, is a light heat-insulating device which remains resistant and efficient at high temperatures, regardless of the stresses to which it is subjected.

BRIEF DESCRIPTION OF THE PRESENT INVENTION

The invention pertains to a heat-insulating device comprising radiation-reflecting elements and a conduction-insulating material, wherein the reflecting elements consist of a large number of reflecting flakes inserted into and distributed through the insulating material facing the surface through which the radiation has to be stopped, and wherein the flakes are juxtaposed and partially overlap one another so as to conceal the said surface.

This device can be used to eliminate the reflecting screens and entails a considerable reduction in weight because, to obtain the same reflecting efficiency, the total volume of flakes used is smaller than that of a screen and therefore weighs less. Furthermore, if the insulating material into which the flakes are inserted is flexible, it becomes possible to change the shape of the entire device without being subjected to problems caused by the rigidity or, conversely, by the lack of solidity of prior art reflecting screens. This is because, with the present invention, the radiation is reflected by a multitude of small mirrors, each consisting of a flake.

The juxtaposition and partial overlapping of the flakes by one another prevents even a fraction of the radiation from crossing the thickness of the device.

Finally, the flakes are held in place by the insulating material itself.

BRIEF DESCRIPTION OF THE DRAWINGS

Other features and advantages of the invention will emerge from the following description of some embodiments, made with reference to the appended figures, of which:

FIG. 1 is a schematic diagram of the working of the device according to the invention;

FIGS. 2 and 3 show two alternative embodiments of the device.

DESCRIPTION OF PREFERRED EMBODIMENTS

FIG. 1 shows the schematic drawing of a heat-insulating device according to the invention. This device 1 has a multitude of reflecting flakes 10, 11, 12, 13, 14, 15, 16, which are inserted into and distributed throughout the thickness of the heat conduction insulating material 17. The distribution of the flakes is such that there is a juxtaposition between some of them, namely 10, 13, and 11, 12, as well at least partial overlapping among others, for example, 10, 11, or 10, 12, or 14, 16 or 15, 16. The effect of this structure is to totally block the passage of the incident radiation RI which is then reflected as RF. The overlapping enables a ray R1, which would have passed between juxtaposed flakes 14, 15, to be reflected as R2 by the flake or flakes 16 which are overlapped by these juxtaposed flakes. The flakes are arranged in such a way as to conceal the entire area facing the radiation or, preferably, the entire area of the device that has to act as an obstacle to radiation. In fact, for special applications, it is possible to envisage windows in the device that let through a part of the radiation.

Of course, this FIG. 1 is only a schematic illustration and the dimensions, especially those of the flakes, are not to scale. In particular, the device has the shape of a panel which may be flexible or rigid depending on the consistency of the insulating material, and the dimensions of this panel are, in fact, such that its thickness e, in which the flakes are set, is substantially smaller than the other dimensions of the panel which determine the plane that is orthogonal to radiation. The total thickness of an efficient device may be smaller than 1 cm. while the other dimensions may be of any magnitude and depend solely on the surface of the area that the device is designed to shield or insulate.

Preferably, the flakes are pre-oriented as shown in this FIG. 1, so that their largest side is substantially perpendicular to the main direction of the incident radiation, in order that the reflecting capacity of each flake is used to the maximum extent to give the device optimum efficiency.

The pre-orientation and distribution of the flakes may be done as follows: the flakes are distributed uniformly on a flat support so as to constitute a sheet. The said sheet is preferably made cohesive by means of a temporary binder or by agglomeration enabling it to be handled in order to be positioned in the conduction-insulating material. In other cases, electrostatic properties are used to join the flakes together before they are positioned. This sheet is then placed on a first thickness of insulating material, and a second thickness of material is placed on the sheet to hold it in position. At this moment, there may a split in the sheet or the binder may be dissolved, causing a separation of the flakes. This may cause holes to appear in the sheet. In order to eliminate the harmful effect of these holes which would tend to let radiation through, at least one other sheet is then placed either directly on the first sheet or on one of the thicknesses of insulating material adjacent to the first sheet so that, by successive overlappings, it becomes impossible for radiation to pass through.

Equally, one and the same sheet can be made with several successive layers of flakes to prevent the appearance of holes upon splitting or upon the dissolving of the bonder, so that a single sheet made in this way can suffice to stop the radiation even after splitting or dissolving.

In a preferred embodiment, the flakes each have a thickness of about 1 micron and an area of a few hundredths of square millimeters.

FIG. 2 shows a cross-section of an embodiment in which the conduction-insulating material 18 is an insulating wool such as mineral wool, quartz wool, organic wool or any other wool, consisting of long fibers.

The flakes are distributed along sheets 19, the said sheets being distributed between the two successive layers of fibers 18, as shown in the upper zone of FIG. 2, and/or the flakes are inserted between the fibers without being formed into sheets, as shown in the lower zone 20 of this FIG. 2.

Thus, the device may take the form of a mat of insulating wool in which there are interposed sheets of flakes, or else the shape of a mat of wool between the fibers of which the flakes are inserted. Again the device may take the form of a mat that confines flakes in its fibers, and furthermore, comprises sheets made up of flakes between two layers of fibers.

This type of embodiment, based on insulating wool, is especially suited to the making of flexible devices which are efficient at high temperatures.

FIG. 3 gives a schematic view of an alternative embodiment in which the conduction-insulating material 21 is a resin or any other binder. In this alternative, the flakes are held in position extremely well since the binder or resin flows everywhere. Here again, the flakes can be distributed as in the alternative of FIG. 2, namely either in sheets 22 or more homogeneously 23 in the entire volume of the insulating material.

In the various embodiments, the flakes may consist simply of a reflecting material such as a metal reduced to the state of flakes. This solution is a worthwhile one in cases where the reflecting material is easy to split up or else when it is not too costly.

In other cases, a material that can be easily split up and therefore reduced to the state of flakes is used as a support for a reflecting material. This second method is advantageous in cases where the reflecting material is costly or difficult to split up.

Thus, in one embodiment according to this second method, the reflecting elements consist of mica flakes coated with gold. The gold may be deposited by physical/chemical processes known per se . This type of mica-based flake coated with gold has special electrostatic properties through which sheets can be made, without using binder, before they are positioned in the conduction-insulating material.

What is claimed is:

1. A light-weight, heat-insulation device for aeronautical use which protects a surface from an incident radiation with efficiency at temperatures in the range of at least 800° C., consisting of:
   a conduction-insulating material, and
   a plurality of reflecting flakes inserted into and distributed through the conduction-insulating material, the plurality of reflecting flakes being juxtaposed and overlapping each other so as to conceal the surface from the incident radiation.

2. A device according to claim 1, wherein the plurality of flakes are oriented so that the largest side of each flake of the plurality of flakes is substantially orthogonal to the main direction of the incident radiation that strikes the device.

3. A device according to claim 1, wherein the plurality of flakes are distributed in the form of sheets placed between two thicknesses of the conduction-insulating material.

4. A device according to claim 3, wherein the sheets are made of agglomerated flakes.

5. A device according to claim 3, wherein the sheets are held in position by means of a binder.

6. A device according to claim 3, wherein the sheets are held in position by their electrostatic properties.

7. A device according to claim 1, wherein the flakes are distributed throughout the volume of the insulating material.

8. A device according to claim 1, wherein the conduction-insulating material is made of a long-fibered wool.

9. A device according to claim 8, wherein the plurality of reflecting flakes form at least one sheet interposed between two thicknesses of fibers of said long-fibered wool.

10. A device according to claim 8, wherein the plurality of reflecting flakes are distributed homogeneously between the fibers of said long-fibered wool.

11. A device according to claim 1, wherein the flakes are made of a reflecting metal.

12. A device according to claim 1, wherein the flakes consist of flakes made of supporting material coated with a reflecting material.

13. A device according to claim 12, wherein the flakes consist of gold-coated mica flakes.

14. A device according to claim 1, wherein the conduction-insulating material is made of resin.

* * * * *